United States Patent [19]

Messik

[11] Patent Number: 5,243,927
[45] Date of Patent: Sep. 14, 1993

[54] HYDRAULICALLY CONTROLLED BOAT OUTRIGGER

[75] Inventor: Jeffery J. Messick, St. Petersburg, Fla.

[73] Assignee: Talbott Pratt, Clearwater, Fla.; a part interest

[21] Appl. No.: 6,383

[22] Filed: Jan. 19, 1993

[51] Int. Cl.⁵ ............................................. B63B 35/14
[52] U.S. Cl. .................................. 114/255; 248/652; 248/514; 43/27.4
[58] Field of Search ................. 114/255, 126; 43/6.5, 43/21.2, 27.4; 248/652, 653, 654, 514

[56] References Cited

U.S. PATENT DOCUMENTS

| | | | |
|---|---|---|---|
| 2,727,707 | 12/1955 | Wells | 114/255 |
| 2,927,754 | 3/1960 | Davis | 248/40 |
| 3,724,791 | 4/1973 | Mason | 248/42 |
| 4,384,542 | 5/1983 | Wilson | 114/255 |
| 4,813,171 | 3/1989 | Cooper et al. | 43/27.4 |
| 5,140,928 | 8/1992 | Frick | 114/255 |

*Primary Examiner*—Jesus D. Sotelo
*Attorney, Agent, or Firm*—Herbert W. Larson

[57] ABSTRACT

A tubular housing is mounted to an outside bulkhead of a vessel with a tubular outrigger pole socket mounted at a first end to the tubular housing. An outrigger pole is mounted to the pole socket at a second end. A connecting strut, attached to a movable bracket at a first end, moves at one end within a slot in the tubular housing. The connecting strut, attached to a slidable bracket at a second end, moves at a second end within a slot in the pole socket. A collapsible strut supports the pole socket. A piston is hydraulically driven upwards within the tubular housing to retrieve the outrigger. The outrigger is deployed by pumping hydraulic fluid back to a pump reservoir. The pump is controlled electrically by a switch mounted on the vessel's steering panel.

12 Claims, 5 Drawing Sheets

HYDRAULICALLY CONTROLLED BOAT OUTRIGGER

BACKGROUND OF THE INVENTION

1. Field of the Invention

This invention relates to outrigger devices for fishing vessels. More particularly, it refers to a hydraulic control system for deploying or retrieving an outrigger device from a fixed and locked position alongside a vessel to or from an outward position over the water for use in fishing.

2. Description of Prior Art

Many different devices and brackets exist for mounting and controlling outriggers for fishing vessels. U.S. Pat. No. 2,927,754 describes a mechanically geared apparatus for deploying an outrigger. U.S. Pat. No. 3,724,791 describes an outrigger mount having a forward and backward web. These webs provide opposed faces between which a pivot sleeve is rotatably journalled on a pivot pin. The pole can be rotated and locked in any one of several positions. U.S. Pat. No. 4,384,542 describes an outrigger device connectable to a portion of a flying bridge with a quick release feature. A collapsible brace is pivotally connected to the outrigger pole. U.S. Pat. No. 4,813,171 describes a power operated outrigger that can be hydraulically driven. The system employs the hydraulic drive within a drive housing. The housing includes a tube from which a rod extends. This rod acts on a beam deploying the outrigger pole. U.S. Pat. No. 5,140,928 describes an outrigger system employing two hydraulic rams connected to and rotatable with a rotatable disc mechanism operating the outrigger pole in a fore and aft and in and out position.

Many types of outriggers depend on physical contact between the outrigger device and the crew of the vessel to place the device in their working or stored position as in the first three cited references. Still others employ some amount of hydraulic control to eliminate the contact as in the later two cited references. There is a need for a system which eliminates all physical contact between the outrigger device and the crew whereby the device can be deployed and retrieved through the control of a hydraulic pump and piston system which is activated by a switch conveniently located for the crew of the vessel, but still maintains a manual method for deploying or retrieving the device as necessary.

SUMMARY OF THE INVENTION

I have invented a hydraulically controlled outrigger device for use aboard fishing vessels. The outrigger device is displayed for use and retracted for storage through the use of hydraulic pressure generated through a pump and activated by an electric switch.

A vertical tube attaches along an outside cabin bulkhead of a fishing vessel by means of a top and bottom mounting plate. The vertical tube houses a hydraulic fluid cylinder, a piston, and a car assembly. An engaging pin mounts on top of the car assembly and functions as a locking mechanism for storing the outrigger device. A hydraulic pump, activated by the switch located on the steering panel, pumps fluid through a hose into the fluid cylinder to propel the piston and raise the car assembly thereby locking the outrigger device in a fixed position along the outside cabin bulkhead of the fishing vessel. Upon activation, via the electric switch, the pump withdraws fluid from the fluid cylinder thereby lowering the car assembly and releasing the pin lock mechanism which in turn displays the outrigger device for use.

A pole socket attaches to the vertical tube by means of a fixed bracket. The pole socket houses an outrigger pole together with a latching spring, tension adjustment screw, and slide car assembly. The latching spring is under tension when the outrigger device is locked and stored. The tension on the spring releases as the outrigger device is being displayed thereby assisting in its display. A locking pin protrudes from the pole socket and contains an engaging hole. The engaging pin mounted within the piston car assembly locks together with the locking pin of the pole socket when the piston is filled with fluid. A connecting strut attaches at two ends through the vertical tube and the pole socket and assists in deploying and retrieving the outrigger device. Both the pole socket and the connecting strut are substantially parallel with the vertical tube when the outrigger device is locked and stored.

A collapsible strut attaches at one end to the pole socket by means of a two directional pivoting bracket and mounts at the other end to the top of a gunnel of the fishing vessel aft of the pole socket by means of a two directional pivoting mounting plate. The collapsible strut is at about a forty-five degree angle aft of the vertical tube when the outrigger device is locked and stored.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
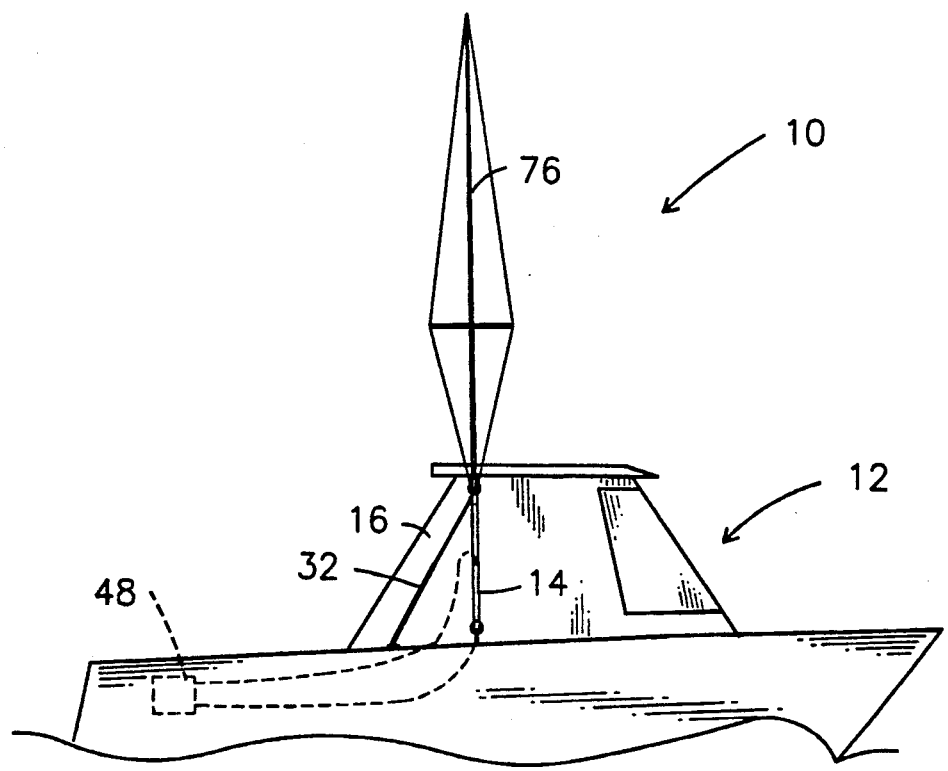
FIG. 1 is a side elevation view of the mounted outrigger device in its fixed and locked position with the pump and hydraulic lines in phantom.

Throughout the following detailed description, the same reference numerals refer to the same elements in all figures.

Figure 2:
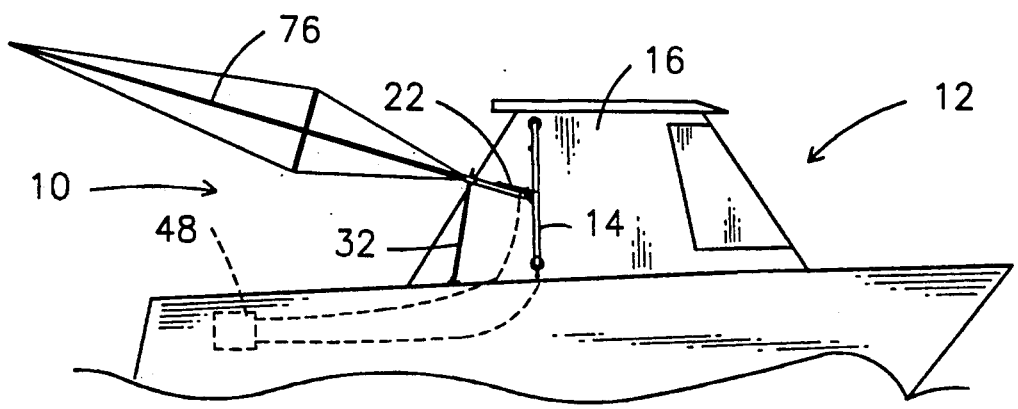
FIG. 2 is a side elevation view of the mounted outrigger device in its displayed position with the pump and hydraulic lines in phantom.
Figure 3:
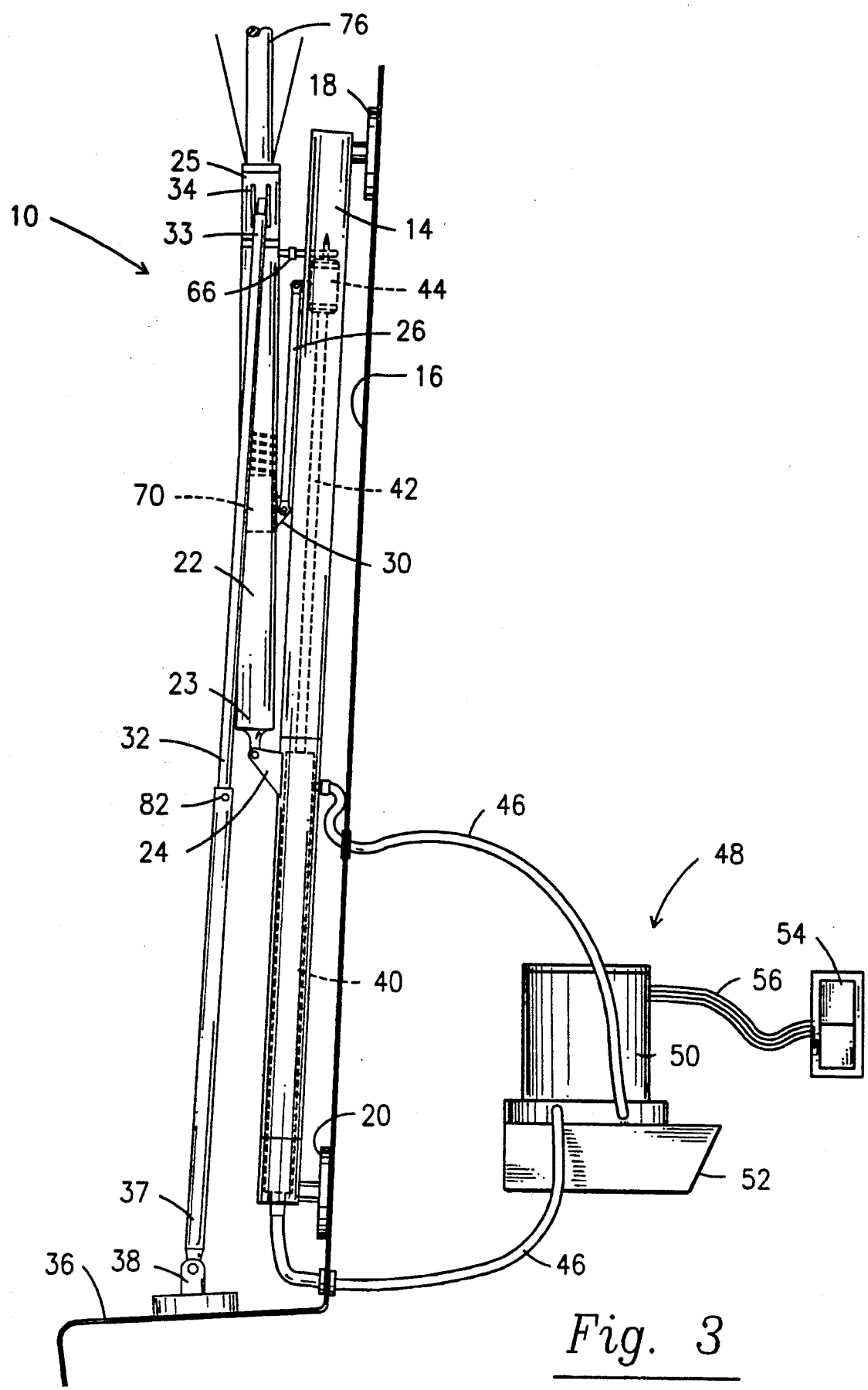
FIG. 3 is a side elevation view of the mounted outrigger device in its fixed and locked position, showing the piston car assembly in phantom, together with a side elevation view of the hydraulic lines, pump, and switch.
Figure 4:
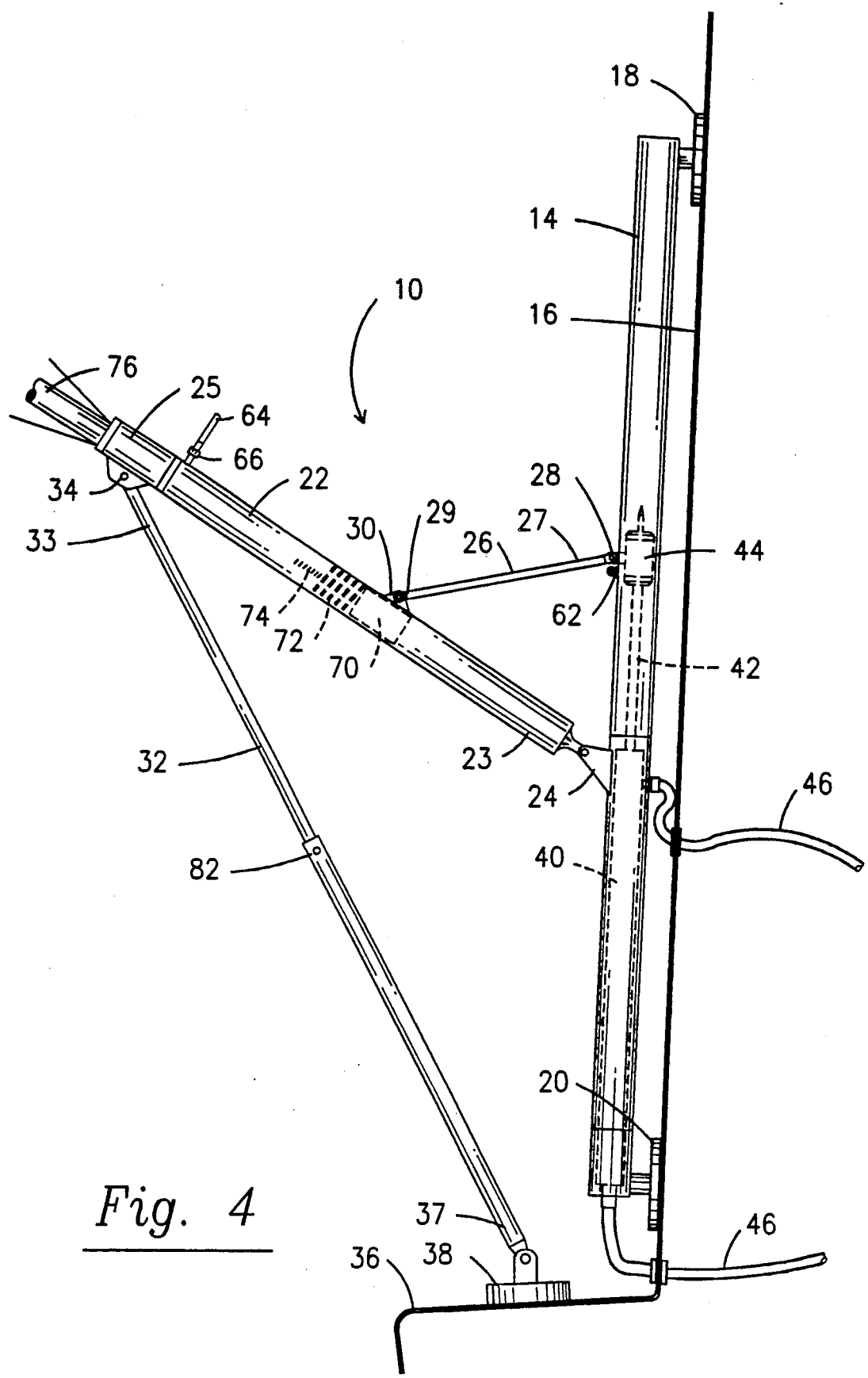
FIG. 4 is a side elevation view of the mounted outrigger device in its displayed position together with the piston car assembly in phantom.

The hydraulically operated outrigger 10 of the invention mounts to a fishing vessel 12 as shown in FIGS. 1 and 2. The principal component parts are a vertical tubular housing 14 mounted to an outside cabin bulkhead 16 of the fishing vessel 12 by a top mounting plate 18 and a bottom mounting plate 20 as shown in FIGS. 3 and 4. An outrigger pole socket 22 attaches to the vertical tubular housing 14 at a first end 23 by a fixed bracket 24 as shown in FIGS. 3 and 4. A connecting strut 26 attaches through a slot 80 in the vertical tubular housing 14 at a first end 27 by a first slidable bracket 28 and attaches through the outrigger pole socket 22 at a second end 29 by a second slidable bracket 30 as shown in FIGS. 3 and 4.

A collapsible strut 32 attaches to the outrigger pole socket 22 at a first end 33 by a two directional pivoting bracket 34 and mounts to a gunnel 36 of the fishing vessel 12 aft of the tubular housing 14 at a second end 37 by a two directional pivoting plate 38 as shown in FIGS. 3 and 4. A removable pin 82 runs through the middle of the collapsible strut 32.

Figures 5, 6, 7:
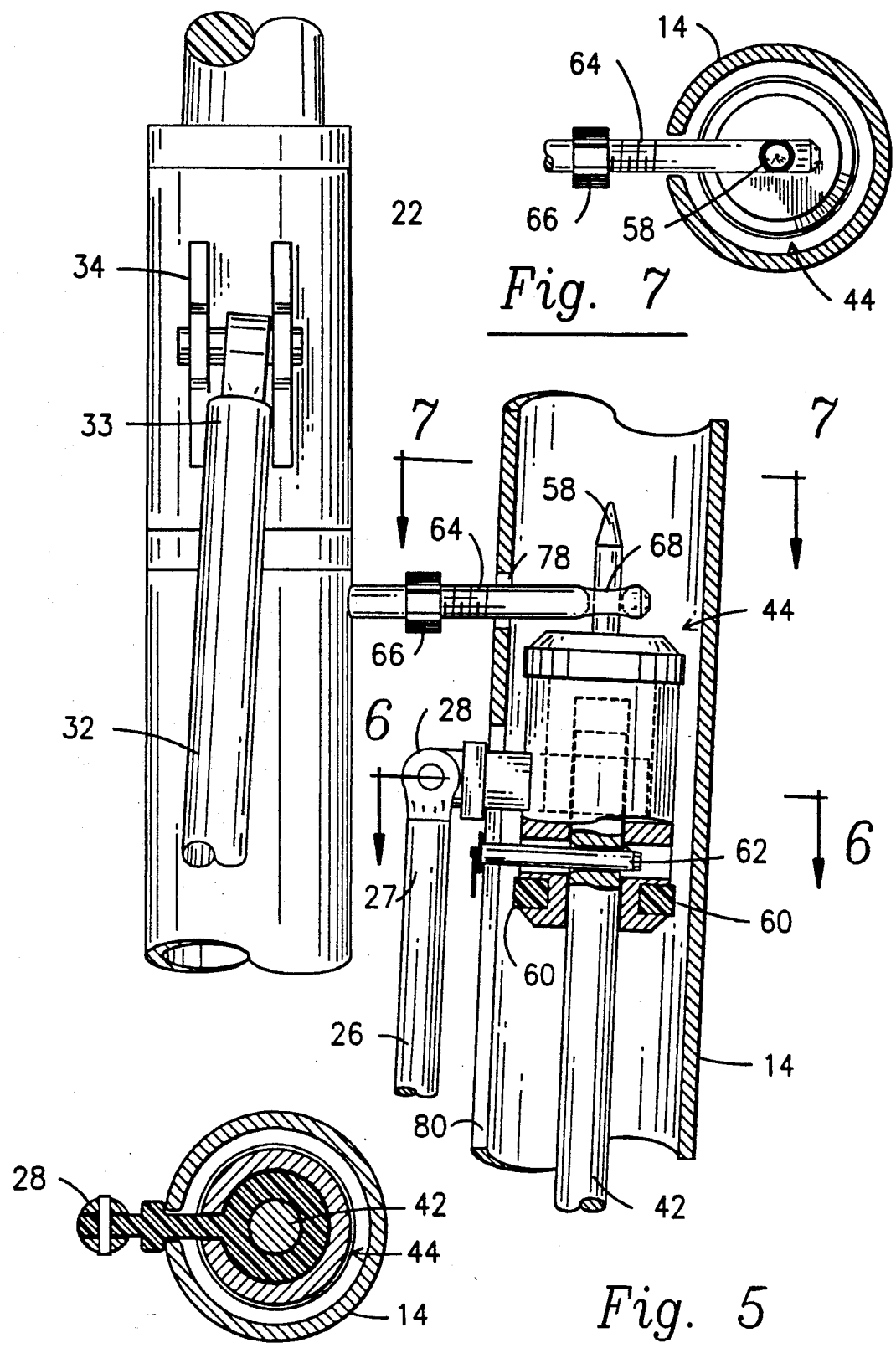
FIG. 5 is a partial side sectional view of the tubular housing showing the piston car assembly in its fixed and locked position, together with a partial side elevation view of the pole socket.
FIG. 6 is a top cross-sectional view of the tubular housing along lines 6—6 of FIG. 5.
FIG. 7 is a top cross-sectional view of the tubular housing along lines 7—7 of FIG. 5.
Figure 8:
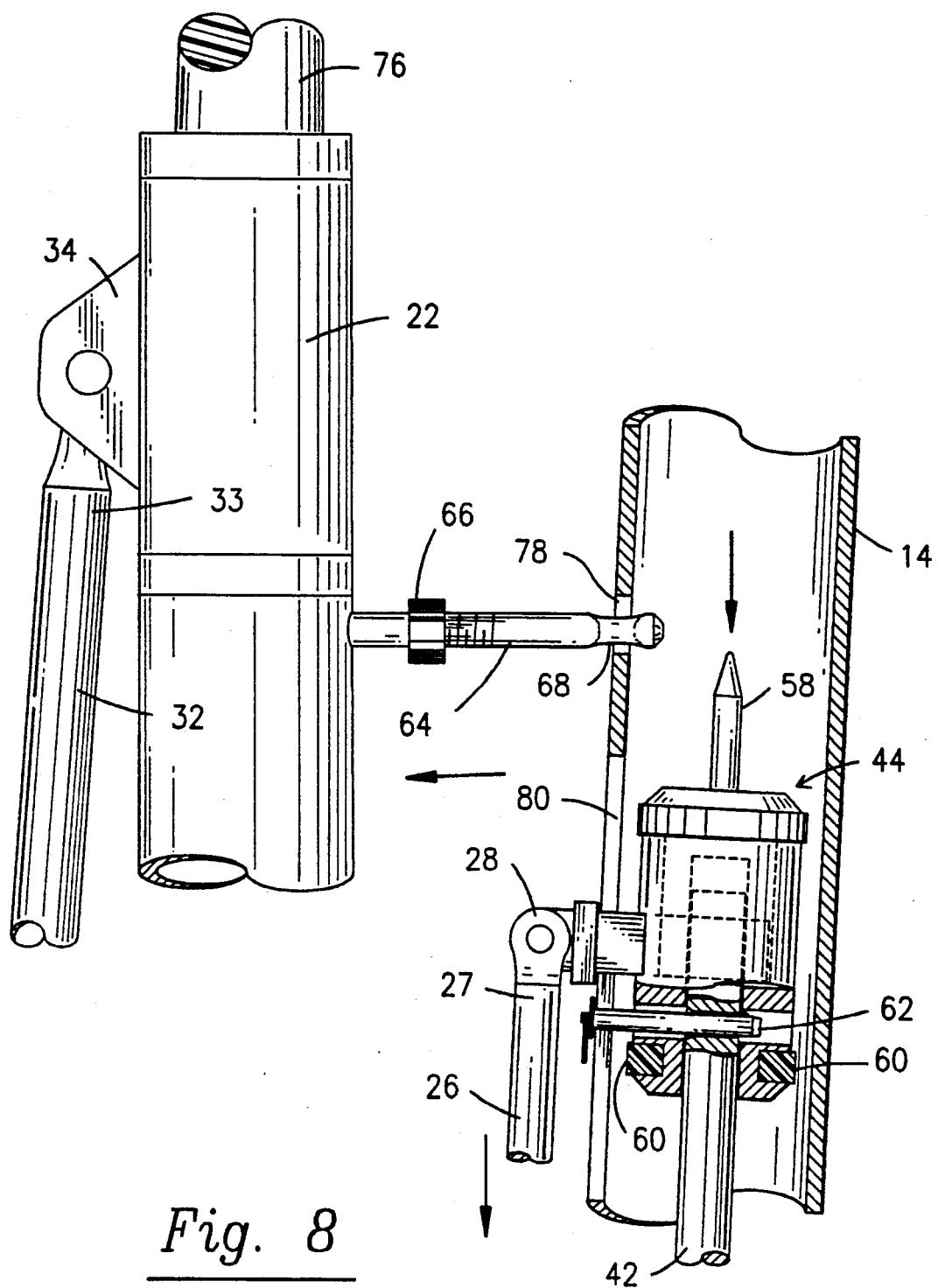
FIG. 8 is a partial side sectional view of the tubular housing showing the piston car assembly disengaging to display the outrigger device together with a partial side elevation view of the pole socket.

The vertical tubular housing 14 contains a hydraulic fluid cylinder 40 to propel a piston, a piston shaft 42, a piston car assembly 44, and a locking pin guide hole 78 as shown in FIGS. 3 and 4. The piston car assembly 44 rides on bearings 60, mounts on top of the piston shaft 42 and contains an engaging pin 58 which attaches vertically on top of the piston car assembly 44 as shown in FIGS. 5 and 8. A quick release pin 62, as shown in FIGS. 5 and 8, provides a manual method of displaying and retrieving the outrigger device 10.

The outrigger pole socket 22 contains a locking pin 64, together with an adjuster 66. The locking pin 64 has a locking pin aperture 68 through which the engaging pin 58, of the piston car assembly 44, penetrates as shown in FIGS. 5 and 7. In addition, the pole socket 22 houses a latching car assembly 70, a latching spring 72, a latching tension adjustment screw 74, and an outrigger pole 76 as shown in FIGS. 3 and 4.

Two hoses 46 run between the vertical tubular housing 14 and a hydraulic pump 48. The principal components of the pump 48 are a motor 50, a hydraulic fluid reservoir 52, an electric switch 54 usually mounted on the vessel's steering panel, and a set of electrical lines 56 as shown in FIG. 3. The electric switch 54 is powered by a twelve volt battery. The pump 48 is activated by the switch 54 causing the motor 50 to start which in turn propels fluid between the reservoir 52 and the hydraulic cylinder 40 through the hoses 46.

The hydraulically operated outrigger 10 is in its locked and stored position, as shown in FIG. 3, when the hydraulic cylinder 40 is filled with fluid. The outrigger 10 is in its displayed and usable position, as in FIG. 4, when the hydraulic cylinder 40 is empty.

With the outrigger 10 in its displayed position, as shown in FIG. 4, and as the hydraulic cylinder 40 is filled with fluid, the piston shaft 42 rises through the vertical tubular housing 14. The first end 27 of the connecting strut 26 is attached to the piston car assembly 44 by the first slidable bracket 28 and rises with the piston car assembly 44 mounted on top of the rising piston shaft 42. The second end 29 of the connecting strut 26 is attached to the latching car assembly 70 by the second slidable bracket 30 and moves upward through the outrigger pole socket 22 causing the outrigger pole socket 22 to be pulled towards the vertical tubular housing 14. Tension is placed on the latching spring 72 as the connecting strut 26 pushes the latching car assembly 70 upward through the outrigger pole socket 22. As the piston shaft 42 together with the piston car assembly 44, rises through the vertical tubular housing 14, the locking pin 64 enters the vertical tubular housing 14 through the locking pin guide hole 78. The engaging pin 58 traverses the locking pin 64 through the locking pin aperture 68 and locks the outrigger 10 in its stored position as shown in FIGS. 3 and 5. With the hydraulic cylinder 40 full of fluid, the outrigger pole socket 22 reaches a substantially parallel position with respect to the vertical tubular housing 14 as shown in FIG. 3. The collapsable strut 32 is at about forty-five degrees with respect to the pole socket 22 in this configuration. Both the top pivoting bracket 34 and the bottom pivoting plate 38 rotate 90 degrees counter clockwise so that the collapsible strut 32 may reach its substantially vertical position with respect to the vertical tubular housing 14.

With the outrigger 10 in its stored and locked position, as shown in FIG. 3, the pump 48 is activated to empty the hydraulic cylinder 40 of fluid. The piston shaft 42 falls downward through the vertical tubular housing causing the engaging pin 58 to disengage from the locking pin 64. This disengaging action, as shown in FIG. 8, causes the outrigger pole socket 22 to fall away from its vertical stored position and toward its outward displayed and usable position Tension is released from the latching spring 72 causing the latching slide car assembly 70 to push downward through the pole socket 22 thereby assisting in the display of the outrigger 10. As the hydraulic cylinder 40 continues to empty, the connecting strut 26 moves towards a substantially horizontal position with respect to the water surface and the collapsible strut 32 moves towards its outward displayed position relative to the water surface. Both the top pivoting bracket 34 and the bottom pivoting plate 38 rotate 90 degrees clockwise so that the collapsible strut 32 may reach its displayed position as shown in FIG. 4.

The vertical tubular housing 14, the struts 26 and 32, and the outrigger pole socket 22 are generally made of aluminum, but can also be made from a high strength polymer or stainless steel. The fixtures are made from stainless steel.

Equivalent mechanical devices can be substituted for the devices set forth above to achieve the same results in the same manner.

Having thus described the invention, what is claimed and desired to be secured by Letters Patent is:

1. A hydraulically controlled system for deploying and retrieving an outrigger mounted on a sport fishing vessel comprising
   (a) a tubular housing mounted upright on an outside bulkhead of the fishing vessel,
   (b) a tubular outrigger pole socket mounted at a first end to the tubular housing,
   (c) a connecting strut attached at a first end to a first slidable bracket movable within a slot in the tubular housing,
   (d) the connecting strut attached at a second end to a second slidable bracket movable within a slot in the outrigger pole socket,
   (e) a collapsible strut attached at a first end to a second end of the outrigger pole socket,
   (f) the collapsible strut attached at a second end aft of the tubular housing to a gunnel of the fishing vessel,
   (g) an outrigger pole mounted in the second end of the outrigger pole socket,
   (h) a hydraulic fluid cylinder driving a piston slidable within the tubular housing, (i) the piston driving a piston car assembly attached to the first slidable bracket, and (j) a hydraulic pump supplying hydraulic fluid to the fluid cylinder, the outrigger being deployed when the fluid cylinder is emptied by the hydraulic pump and the outrigger being retrieved when the fluid cylinder is filled by the hydraulic pump.

2. The hydraulically controlled system for deploying and retrieving an outrigger according to claim 1 wherein the outrigger pole socket contains a movable latching slide car attached to the second slidable bracket.

3. The hydraulically controlled system for deploying and retrieving an outrigger according to claim 2 wherein the latching slide car is attached to a latching spring controlled by a latching tension adjustment screw.

4. The hydraulically controlled system for deploying and retrieving an outrigger according to claim 1 wherein the first end of the collapsible strut is attached to the second end of the outrigger pole socket with a two directional pivoting bracket.

5. The hydraulically controlled system for deploying and retrieving an outrigger according to claim 1 wherein the second end of the collapsible strut is attached to the gunnel with a two directional pivoting plate.

6. The hydraulically controlled system for deploying and retrieving an outrigger according to claim 1 wherein the tubular housing is mounted to the outside bulkhead of the fishing vessel at a first and second end by a top and bottom mounting plate respectively.

7. The hydraulically controlled system for deploying and retrieving an outrigger according to claim 1 wherein the outrigger pole socket is mounted at its first end to the tubular housing with a fixed bracket.

8. The hydraulically controlled system for deploying and retrieving an outrigger according to claim 1 wherein a removable pin is mounted in the collapsible strut so that its removal will permit lowering of the outrigger poles for avoiding overhead structures.

9. The hydraulically controlled system for deploying and retrieving an outrigger according to claim 1 wherein the hydraulic pump is activated by an electric switch and powered by a 12 volt battery system on the fishing vessel.

10. A locking mechanism for an outrigger, located within a tubular housing, supporting the outrigger, comprising
    (a) a piston car assembly,
    (b) an engaging pin mounted vertically at a first end on the piston car assembly,
    (c) a locking pin mounted horizontally at a first end on an outrigger pole socket, attached at one end to the tubular housing,
    (d) a locking pin guide hole located at a top portion of the tubular housing,
    (e) a locking pin aperture located at a second end of the locking pin, so that upon upward movement of the piston car assembly, the engaging pin traverses the locking pin aperture to lock the outrigger pole socket to the tubular housing.

11. The locking mechanism for an outrigger according to claim 10 wherein an adjuster is mounted on the locking pin to regulate the spacing between the tubular housing and the outrigger pole socket.

12. The locking mechanism for an outrigger according to claim 10 wherein the piston car assembly is mounted on top of a piston shaft having a piston driven by hydraulic fluid.

* * * * *